United States Patent [19]

Xia

[11] Patent Number: 5,489,827
[45] Date of Patent: Feb. 6, 1996

[54] LIGHT CONTROLLER WITH OCCUPANCY SENSOR

[75] Inventor: Yongping Xia, Torrance, Calif.

[73] Assignee: Philips Electronics North America Corporation, New York, N.Y.

[21] Appl. No.: 239,174

[22] Filed: May 6, 1994

[51] Int. Cl.[6] .......................... H05B 41/36; H05B 37/02
[52] U.S. Cl. .................. 315/294; 315/154; 315/159
[58] Field of Search ................................. 315/291, 294, 315/106, 209 R, 205, 312, 297, 307, DIG. 4, 159, 149, 154, 158, 155; 250/221, 342, 214

[56] References Cited

U.S. PATENT DOCUMENTS

| | | | |
|---|---|---|---|
| 4,751,399 | 6/1988 | Koehring et al. | 307/117 |
| 4,873,469 | 10/1989 | Young et al. | 315/155 |
| 5,055,746 | 10/1991 | Hu et al. | 315/291 |
| 5,068,576 | 11/1991 | Hu et al. | 315/291 |
| 5,107,184 | 4/1992 | Hu et al. | 315/291 |
| 5,142,199 | 8/1992 | Elwell | 315/154 |
| 5,293,097 | 3/1994 | Elwell | 315/154 |
| 5,357,170 | 10/1994 | Luchaco et al. | 315/158 X |

FOREIGN PATENT DOCUMENTS 3706229  3/1988  Germany.

*Primary Examiner*—Ali Neyzari
*Attorney, Agent, or Firm*—Edward Blocker; Bernard Franzblau

[57] ABSTRACT

A system for controlling the intensity of a lamp including a remote sensing device for detecting the presence of an occupant within an area. The device also transmits a signal based on the currently sensed presence of the occupant. After each transmission of an occupancy signal, the device is inhibited from further transmission for a first predetermined period of time to limit power consumption requirements by the battery powered device. The system also includes a light controller responsive to the transmitted occupancy signal for controlling the level of illumination by the lamp. In the absence of a transmitted occupancy signal within a second predetermined period of time, the light controller will instruct the ballast to reduce the level of illumination by the lamp. In the absence of an occupancy signal being transmitted within a third predetermined time period, the light controller will instruct the ballast to turn off the lamp.

38 Claims, 7 Drawing Sheets

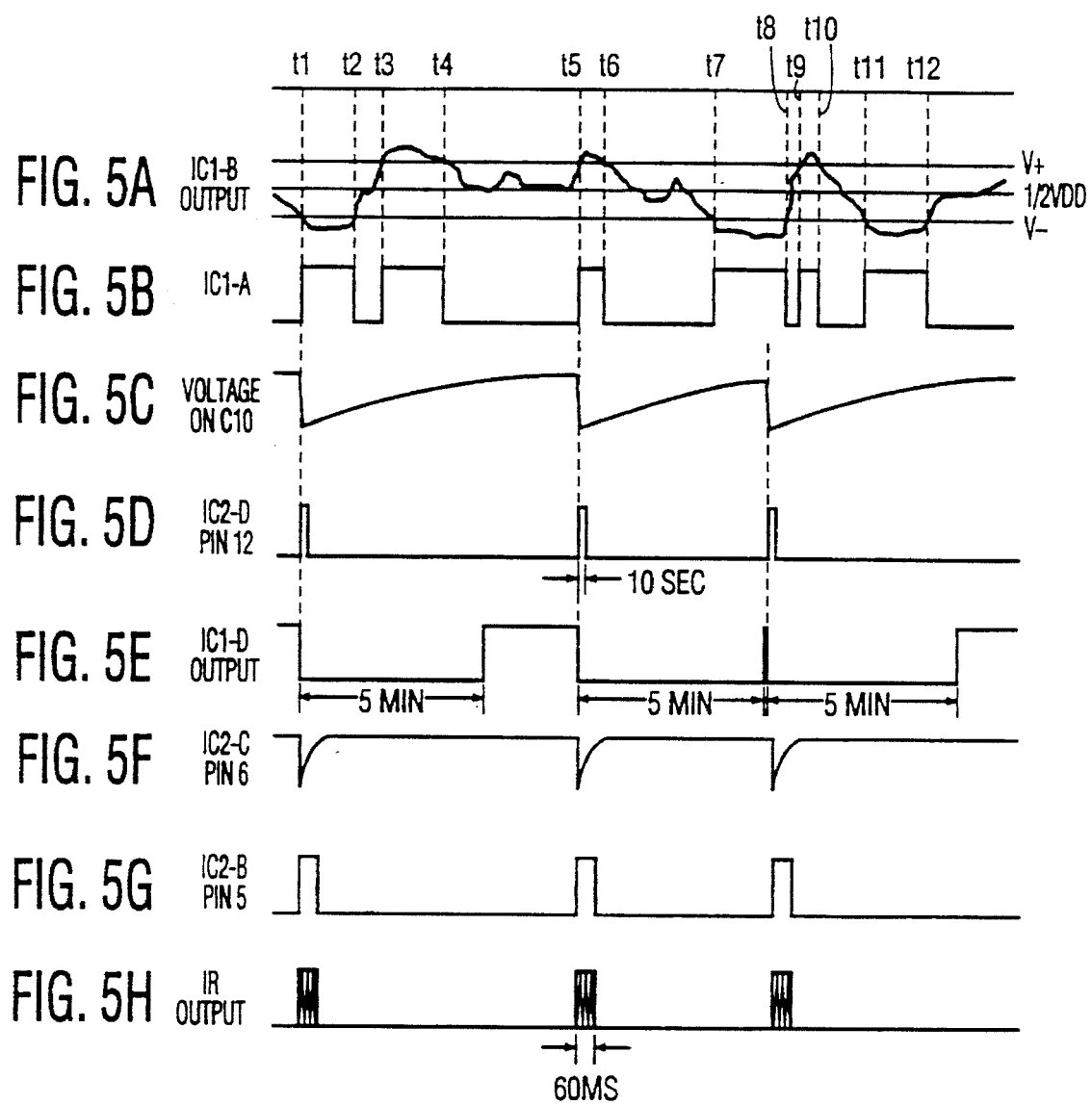

5,489,827

LIGHT CONTROLLER WITH OCCUPANCY SENSOR

BACKGROUND OF THE INVENTION

This invention relates generally to a light controller with occupancy sensor and more particularly to a light controller having an energy efficient, battery powered occupancy sensor.

As is well known, fluorescent lamps offer large energy savings as compared to incandescent lamps. For example, a 28 watt fluorescent lamp produces about the same amount of light as a 100 watt incandescent lamp. With the development of remote controlled fluorescent lamp ballasts, as described in U.S. Pat. Nos. 5,055,746, 5,068,576 and 5,107,184, the contents of which are incorporated herein by reference thereto, fluorescent lamps are now used in applications heretofore restricted to incandescent lamps.

Additional energy savings can be achieved through use of dimmable fluorescent lamp ballasts, that is, through the use of ballast control circuitry (hereinafter referred to as a light controller) for reducing the level of light produced by the fluorescent lamp. Reduction in the level of illumination is particularly applicable in lighting unoccupied areas.

The state of occupancy is typically determined through the use of motion sensors, that is, sensors for detecting the movement of an occupant. These detectors, although having a relatively wide field of view, are nevertheless dependent on their position relative to the occupant. Determining the state of occupancy within an area can be especially difficult when the sensor is not positioned near a relatively motionless occupant (e.g. when the occupant is seated).

A conventional occupancy sensor is generally mounted on a wall or ceiling of a room and integrally connected to the light controller at the time the room is built. The subsequent arrangement of furniture within or shape of the room can block or otherwise limit the field of view of the sensor. It can therefore be difficult for the sensor to determine with a high degree of reliability the state of occupancy within the room.

It is therefore desirable to provide an occupancy sensor independent of (i.e. not physically connected to) the lamp controller. In order to optimize placement of the sensor within the room, the sensor should be battery powered, that is, independent of connection to a utility power line. The sensor also should be operable for extended periods of time (i.e. well over a year) and in combination with a light controller provide automatic light dimming control for an unoccupied area.

SUMMARY OF THE INVENTION

Generally speaking, and in accordance with the invention, an occupancy sensing device for signaling the sensed presence of an occupant within an area includes a detector for sensing the presence of the occupant within the area, a transmitter for producing more than one transmission of an occupancy signal, each signal transmission corresponding to the currently sensed presence of the occupant by the detector and an inhibitor for inhibiting for a first predetermined period of time production of at least one signal transmission following each produced signal transmission.

The device is preferably battery powered, that is, independent of connection to a power line so as to permit optimal positioning of the device within the area to be lit by a lamp. By inhibiting transmission of the occupancy signal following an initial period of transmission, power consumption is minimized thereby extending battery life essential for viable remote operation.

The detector, which preferably continuously senses for the presence of at least one occupant within the area to be lit, is typically of the infrared motion type. Similarly, the transmitted occupancy signal is generally of the infrared type.

The inhibitor includes a timer for determining when a first predetermined period of time has elapsed. During the first predetermined period of time transmission of the occupancy signal is inhibited. The timer includes a comparator for comparing a substantially constant voltage to a time dependent, variable voltage. The device also includes reset circuitry for resetting the time dependent, variable voltage based on the sensed presence of the occupant by the detector. The timer is reset by resetting the time dependent, variable voltage.

In another aspect of the invention, the occupancy signal is received by a light controller for changing the level of illumination of a lamp. In the absence of an occupancy signal received from the transmitter within a second predetermined period of time, the controller automatically reduces the level of illumination produced by the lamp. When no occupancy signal is received within a third predetermined period of time, the light controller controls turning off power to the lamp. Preferably, the first predetermined period of time (e.g. about 5 minutes) is substantially less than the second predetermined period of time (e.g. about 12 minutes) which, in turn, is substantially less than the third predetermined period of time (e.g. about 90 minutes).

In accordance with yet another aspect of the invention, a method for signalling the sensed presence of an occupant within an area includes the steps of sensing the presence of the occupant within the area, producing more than one occupancy signal transmission, each transmission corresponding to the currently sensed presence of the occupant, and inhibiting production of at least one transmission for a first predetermined period of time following each produced transmission.

In accordance with still another aspect of the invention, more than one occupancy sensing device is used for sensing the presence of an occupant within an area. Each device, upon receipt of an occupancy signal transmitted by any other occupancy sensing device responds to such signal to produce its own occupancy signal. By placing a plurality of these devices throughout a room, the problems associated with furniture or the shape of the room limiting the field of view of any one occupancy sensing device are avoided.

Accordingly, it is an object of the invention to provide an improved occupancy sensing device which is independent of connection to a utility power line and which has relatively low power consumption requirements in order to operate the device on battery power for extended periods of time.

It is another object of the invention to provide an improved remote occupancy sensing device which is operable in combination with a lamp controller to automatically minimize the level of illumination within an area to be illuminated when an occupant is not present.

These and other objects and advantages of the invention will, in part, be obvious and will, in part, be apparent from the specification.

The invention accordingly comprises several steps and the relation of one or more such steps with respect to each of the others, and the device embodying features of construction, combinations of elements and arrangements of parts which are adapted to effect such steps, all is exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 5A–5H are waveforms timed relative to each other illustrating the signals produced at certain points within the schematic circuit of FIGS. 4A and 4B.

DETAILED DESCRIPTION OF THE PREFERRED EMBODIMENT

Figure 1:
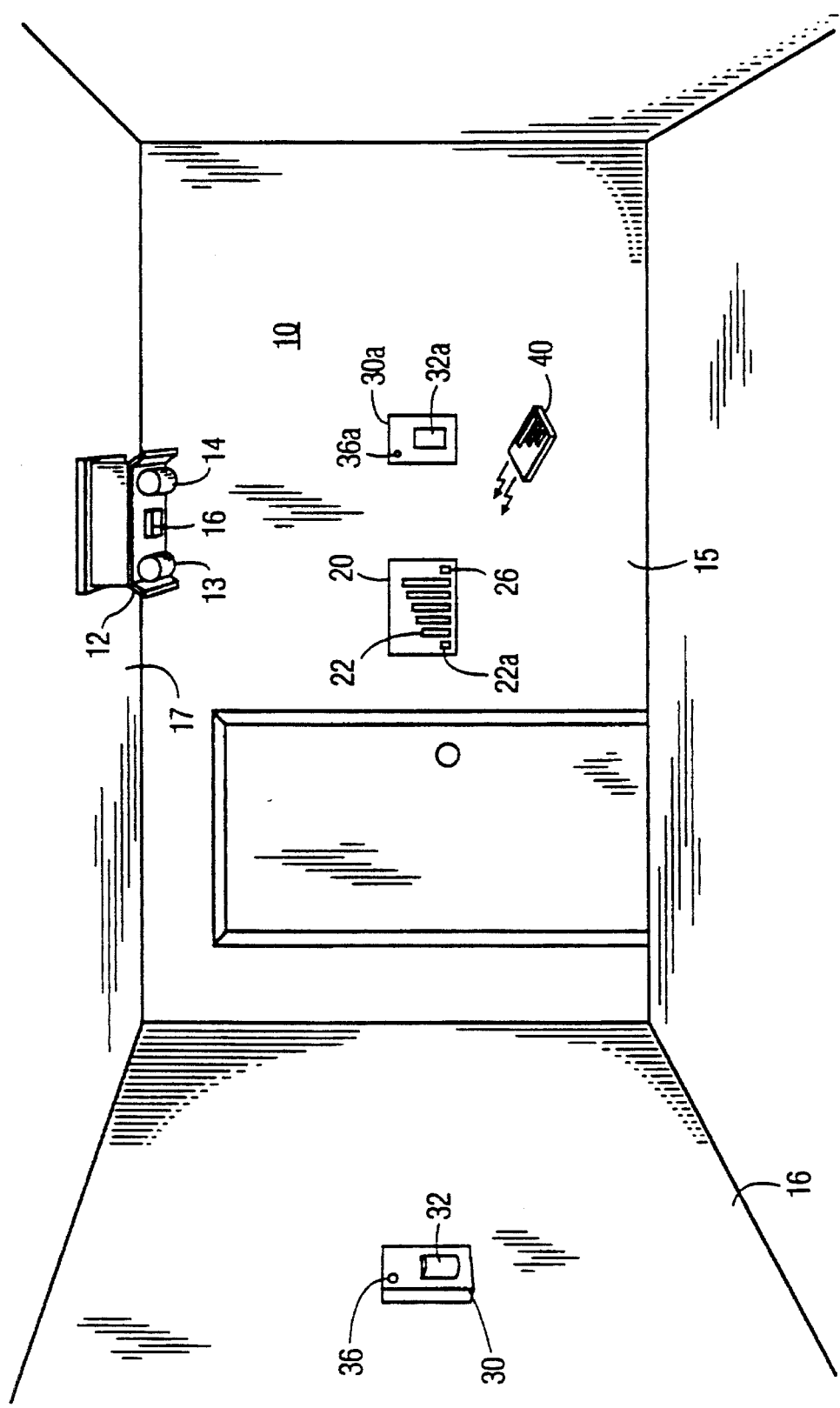
FIG. 1 is a diagrammatic view of a room including a luminaire, a light controller, a pair of remote occupancy sensing devices and a remote dimming controller in accordance with the invention.

Referring now to FIG. 1, an area such as a room 10 (a portion of which is shown) includes a luminaire, such as a fluorescent lighting fixture 12. Fixture 12 has a pair of fluorescent lamps 13 and 14 and a ballast 16 attached to a ceiling 17 for illuminating at least a portion of room 10. A light controller 20 is permanently mounted to or located within a wall 15 of room 10 and electrically connected to the fluorescent lighting fixture 12 and a source of utility line power (not shown) by concealed wires. Controller 20 has a plurality of control keys 22 and an infrared receiver 26. Control keys 22, which include a turn off key 22a, set the level of illumination provided by lighting fixture 12. Ballast 16 includes circuitry responsive to controller 20 for adjusting the power provided to lamps 13 and 14.

A remote occupancy sensing device 30, which is preferably battery powered (i.e. need not be powered from a utility power line), is mounted within room 10 at a location selected to reliably sense the presence of an occupant therein, even when the occupant is seated or otherwise moving very little. Device 30 includes a motion detector 32, which is preferably of the infrared type, and an infrared transmitter 36 for communicating with light controller 20. Although device 30 is shown mounted on a wall 16, it can be located elsewhere including, but not limited to, on a table or other piece of furniture. Placement of device 30 should be at a location which permits most reliably sensing the presence or absence of an occupant within room. Detector 32 preferably has a wide field of view, such as 180°. Alternatively, for application within a long narrow passageway, detector 32 should have a narrow, spot beam type field of view.

In a large room, more than one remote device 30 may be provided such as device 30a which includes a motion detector 32a and an infrared transmitter 36a. Device 30a including motion detector 32a and transmitter 36a are similar in construction and operation to device 30 including motion detector 32 and transmitter 36, respectively. Accordingly, further discussion regarding the implementation and operation of an occupancy sensing device will be limited to device 30.

Depending on the shape of the room, multiple occupancy sensing devices can communicate directly with wall controller 20 or with each other. For example, device 30 can repeat signals received from one or more other occupancy sensing devices in a daisy chain fashion. A number of occupancy sensing devices therefore can be placed within an odd shaped room or within a room cluttered with furniture so as to overcome the problems encountered by a single occupancy sensing device in reliably detecting the presence of an occupant therein.

Detector 32, which is continuously energized, consumes relatively little energy which allows it to be powered by a battery for an extended period of time. Each transmission by device 30 of an infrared signal represents the sensed presence by detector 32 of an occupant within room 10. Circuitry within device 30, discussed in greater detail below, inhibits transmission of the infrared signal for a predetermined period of time following an initial period of transmission. In other words, although detector 32 operates continuously, transmission of a signal representing the currently sensed presence of an occupant is at discrete and within a relatively short interval of time. For example, the first time that detector 32 senses the presence of an occupant within room 10, a signal representing the sensed presence of an occupant is temporarily transmitted by transmitter 36 to light controller 20. Transmission of the signal is for a relatively short period of time. The detected presence of the occupant starts a timer such as, but not limited to, a five minute timer within sensor 30. While the timer is running, further transmissions by transmitter 36 are inhibited, even though detector 32 continues to sense the presence of an occupant within room 10. After the timer has timed out, transmitter 36 is again enabled. The sequence of temporarily transmitting a signal once the presence of an occupant is sensed by detector 32, inhibiting further transmission of the occupancy signal until the timer within the detector times out and resetting of the timer to repeat the sequence results in transmissions of a signal at discrete and relatively short intervals of time.

Device 30 and controller 20 also can be used together with an optional remote dimming controller 40 for remotely adjusting the illumination level of fixture 12. Dimming controller 40 (not shown), includes depressible keys similar to and corresponding in number and function to keys 22 of light controller 20. Light controller 20 and device 30, with or without dimming controller 40 are referred to hereinafter as the light control system.

Figure 2:
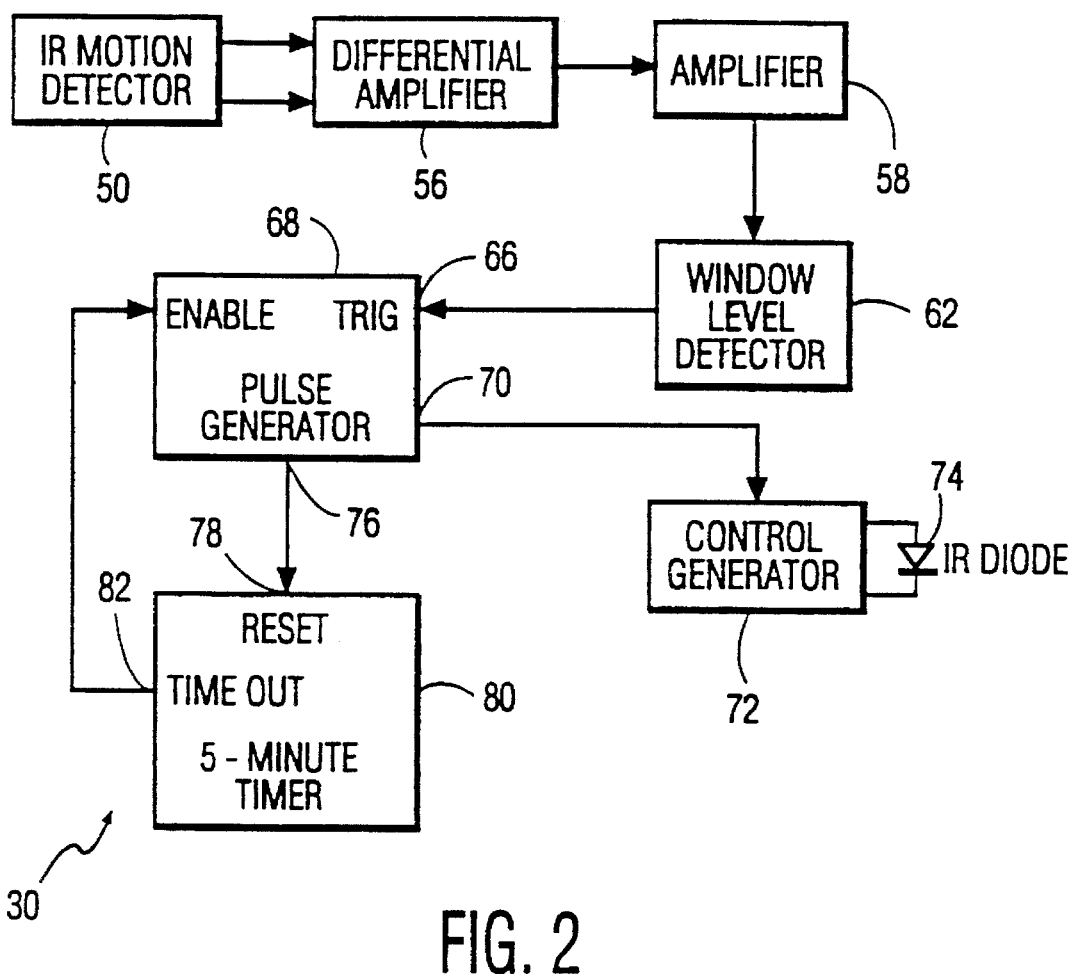
FIG. 2 is a block diagram illustrating the operation of an occupancy sensing device in accordance with the invention.

As shown in FIG. 2, device 30 includes an infrared motion detector 50, preferably of the passive type, having a wide field of view, such as 180°, and is connected to a differential amplifier 56. Amplifier 56 is connected to a bandpass amplifier 58 of the multiple stage type. Amplifiers 56 and 58 together have a high gain, such as about 75 dB. The output of amplifier 58 is connected to a detector 62 of the window level type. Detector 62 produces a trigger signal when its input is above or below a predetermined range or window of levels.

The output of detector 62, shown in FIG. 5B, is inputted to a pulse generator 68 at a trigger input 66. Pulse generator 68 includes a first output 70 connected to a remote control generator 72. Generator 72 produces an encoded signal transmitted by an infrared diode 74 as shown in FIG. 5H. A second output 76 of pulse generator 68 is connected to a reset input 78 of a timer 80. Timer 80 has a latched output 82 connected to an enable input of pulse generator 68 for enabling the latter. The enabling signal produced at output 82 is shown in FIG. 5E and is further discussed below.

Once timer 80 has timed out (e.g. at about 5 minutes), pulse generator 68 is enabled and remains enabled until the trigger signal from window level detector 62 is received at input trigger 66. Upon receiving the trigger signal from window level detector 62 while enabled, pulse generator 68 generates a signal at output 70 supplied to a control generator 72. The signal produced at output 70 and discussed in greater detail below is shown in FIG. 5G. A reset signal, shown in FIG. 5D and produced at output 76 of generator 68, is supplied to input 78 of timer 80 for resetting of the latter. When timer 80 resets, generator 68 is no longer enabled. Subsequent transmission following the initial period of transmission by diode 74 is inhibited by timer 80 in combination with amplifiers 56, 58, detector 62 and generators 68 and 72 until timer 80 once again times out.

Device 30 transmits an occupancy signal each time a predetermined period of time such as, but not limited to, about five minutes has elapsed. The predetermined period of time corresponds to the period of time required to time out timer 80. Detector 32 of device 30 (i.e. detector 50 of FIG. 2) draws very little power, for example, about 50 μA. Device 30, however, consumes considerably more power (e.g. 500 ma) when actually transmitting an infrared signal to light controller 20. Such transmission typically lasts for about 60 mS. It is therefore highly desirable and an important aspect of the invention to minimize the number of transmissions being produced so as to extend the life of the battery powered device 30. Typically, a battery 300 of device 30 (shown in FIG. 4B) includes a pair of AA cells resulting in an expected life of about one and one-half years, assuming that the area to be lit is occupied about 80% of the time.

Although device 30 typically employs an infrared diode 74, other well known devices for transmitting an occupancy signal from device 30 to controller 20 can be used such as, but not limited to, a low power radio frequency transmitter or acoustic, ultrasonic transmitter. The transmitted occupancy signal is encoded with digital information sufficient to distinguish itself from an IR dimming signal. The dimming signal representing a change in the level of illumination is generated by remote dimming controller 40. By providing different identification codes for the occupancy sensing device relative to the dimming controller, more than one pair of remote occupancy sensing devices (e.g. 30, 30a) and dimming controller(s) can be used in close proximity to each other. The different codes distinguish the occupancy sensing devices from one or more remote dimming controllers. Additionally, each occupancy sensing device can be provided with a different identification code so as to distinguish one occupancy sensing device from another. Preferably, when the occupancy sensing device repeats a signal received from another occupancy sensing device, it also repeats the code from the sensing device originating the sensed occupancy.

The light control system of FIG. 1 includes a manual (non-motion sensing) mode and an occupancy sensing mode of operation. Prior to sensing an occupant each time lamps 13 and 14 are first turned on, light controller 20 configures itself into a manual mode of operation. The level of illumination provided by fixture 12 is set by control keys 22 or dimming controller 40 and operates as a manual lamp dimmer. Although light controller 20 has two timers (discussed in greater detail below as timers 1 and 2), neither timer is started automatically when lamps 13 and 14 are first turned on. Timers 1 and 2 have no affect on the operation of lamps 13 and 14 provided no signal has been transmitted from remote occupancy sensing device 30.

The manual mode remains in effect as long as light controller 20 does not receive a signal from remote occupancy sensing device 30. In other words, when light controller 20 is initially energized, it is in the manual mode. Once a signal is received from device 30 and provided that lamps 13 and 14 are at other than a 0% level of illumination, controller 20 changes to and remains in the occupancy sensing mode of operation. Whenever power to light controller 20 is interrupted or lamps 13 and 14 are otherwise turned off, the system returns to its manual mode of operation.

Figure 3:
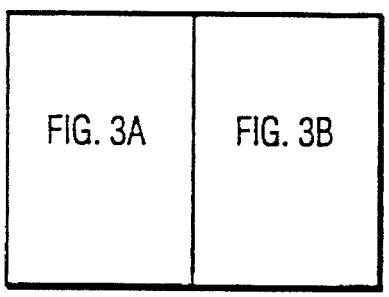
FIG. 3 illustrates the placement of FIGS. 3A and 3B relative to each other.
Figure 3A:
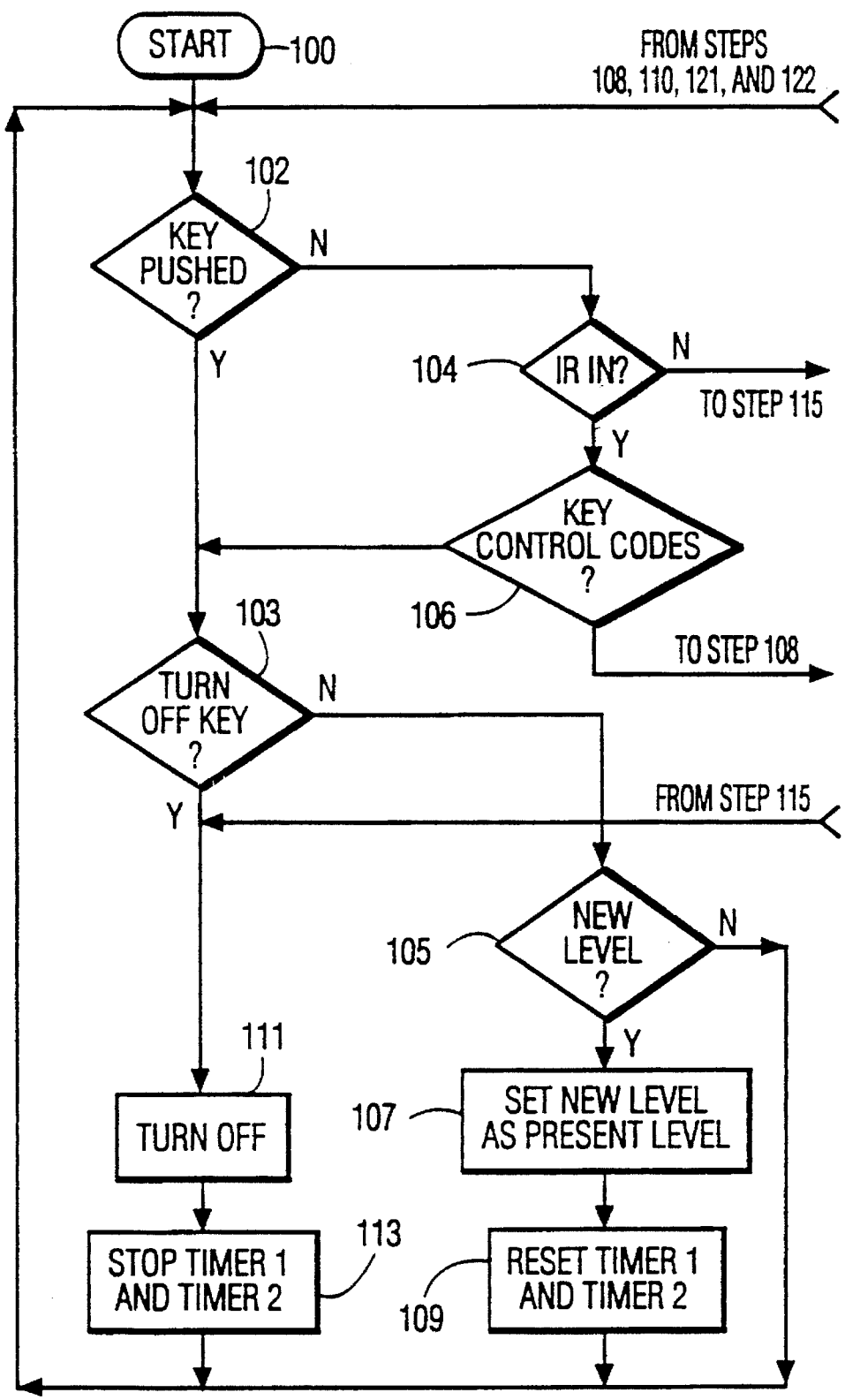
FIGS. 3A and 3B are flow charts illustrating the operation of the light controller in accordance with the invention.
Figure 3B:
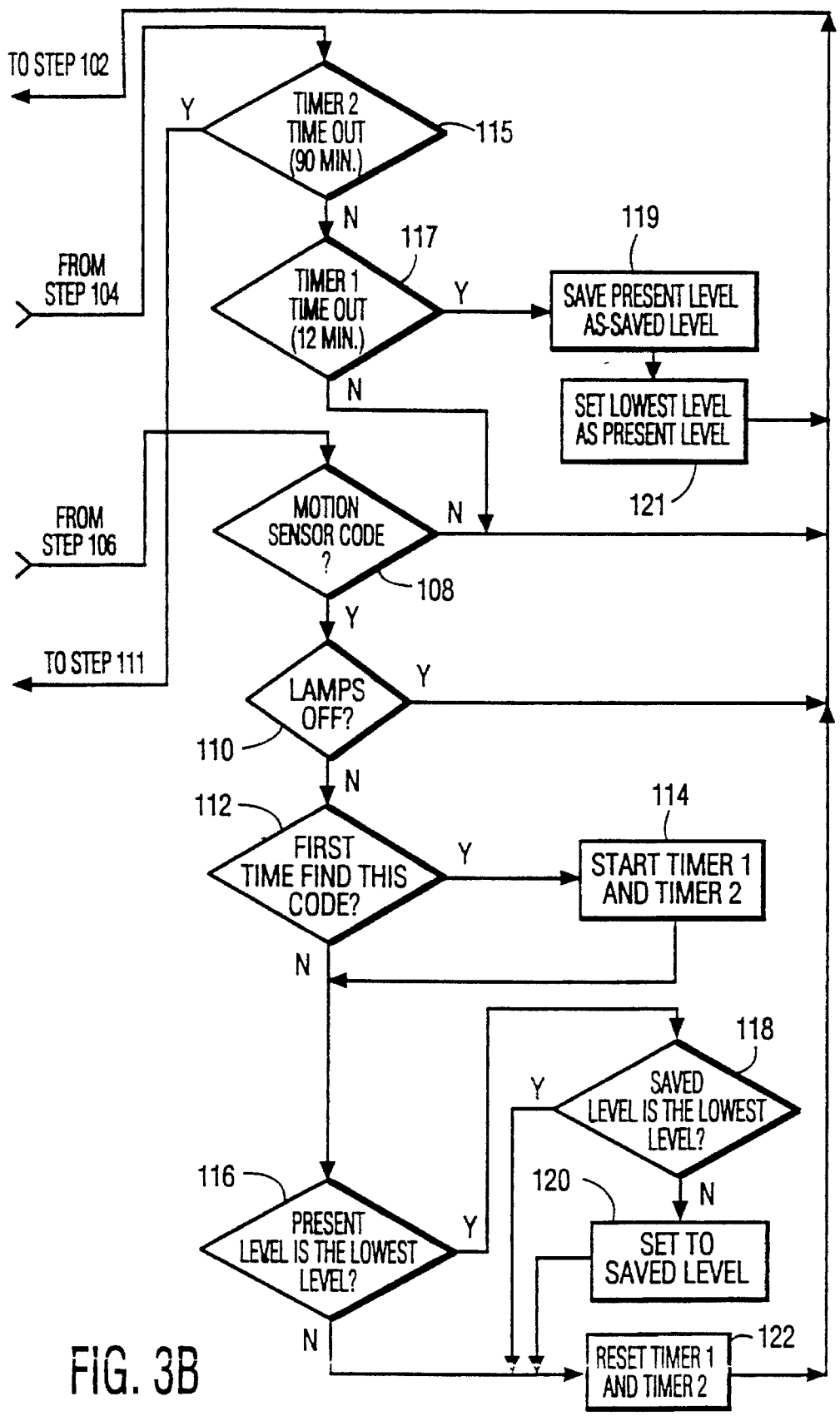

FIGS. 3A and 3B when placed together, as shown in FIG. 3, illustrate operation of light controller 20. Upon activation (i.e. upon initial powering of the system shown in FIG. 1), light controller 20 is in a manual control mode beginning at a START step 100. Light controller 20 has several different light levels ranging from 100% to 0% illumination. Each level is associated with one of control keys 22 of FIG. 1. When a new level of illumination different from the level presently set is desired, control key 22 corresponding to the desired new level of illumination is turned on (e.g. depressed). A decision as to which key 22 has been depressed is determined under a step 102. When the depressed key 22 is other than turn-off key 22a under a step 103, and also represents a new level under a step 105, a new level is set under a step 107. Timers 1 and 2 of light controller 20 are reset under a step 109.

When turn-off key 22a (i.e. 0% illumination) has been turned on under step 103, lamps 13 and 14 are turned off under step 111. Timers 1 and 2 receive a stop signal under a step 113. As can be readily appreciated, the resetting of timers 1 and 2 under step 109 and stopping of timers 1 and 2 under step 113 is not necessary under the manual mode of operation since timers 1 and 2 have never been started. The resetting of timers 1 and 2 under step 109 and stopping of timers 1 and 2 under step 113 is required, as further discussed below, when in the occupancy mode of operation. When timers 1 and 2 have been stopped under step 113 or when no new level has been set under step 105 or when timers 1 and 2 have been reset under step 109, operation of light controller 20 returns to step 102.

If no key 22 including turn off key 22a has been depressed under step 102, and no infrared signal from the remote occupancy sensing device 30 has been received under a step 104, timers 1 and 2 are tested under a pair of steps 115 and 117. Since neither timer 1 nor timer 2 has been started, neither has timed out and operation will return to step 102. The foregoing operation of light controller 20 represents its manual mode which continues as long as no infrared signal is received from device 30 or if such signal is received during a period of time that lamps 13 and 14 are turned off.

The first time an occupancy signal transmitted by device 30 is received by controller 20, operation proceeds from step 102 through testing for an IR signal under step 104 to determining whether the transmitted IR signal represents a key 22 control code under step 106. More particularly, the IR signal is tested to determine whether the signal has been transmitted by device 30 or some other device such as dimming controller 40 or a non-related IR signal (e.g. from a T.V. remote control unit). When the IR signal has been transmitted by controller 40, which represents a desired illumination level, operation of controller 30 proceeds under step 103 as described above.

If no control code is received indicating a change in illumination level from controller 40, controller 20 tests for sensed motion under a step 108. When no motion sensor code is detected, operation of controller 20 returns to step 102. When a motion sensor code is detected, the illumination level is tested under a step 110 to determine whether light controller 20 has previously turned off lamps 13 and 14 (i.e. whether the present illumination level is at 0%). When lamps 13 and 14 are turned off, operation of controller 20 returns to step 102. When, however, light controller 20 has not turned off lamps 13 and 14, a determination is made as to whether controller 20 has received the motion sense code for the first time (i.e. since timers 1 and 2 have been started) under step 112. Timer 1 and timer 2 are started under step 114 the first time that the motion sensed code is received by controller 20. Once timers 1 and 2 are running, light controller 20 changes from a manual mode of operation to an occupancy mode of operation and remains in the occupancy mode until timer 2 is stopped under step 113.

After timers 1 and 2 have been started under step 114 or when it is determined under step 112 that controller 20 has previously received the motion sensed code, a determination is made under step 116 as to whether the present illumination level is at the lowest non-zero level of illumination. The lowest non-zero level of illumination is generally a preset level at which an occupant can see within room 10 although not a level suitable for reading, such as, but not limited to, about 9% of the brightest level of light produced by lamps 13 and 14. Lamps 13 and 14 already may be at the lowest non-zero illumination level by the occupant having depressed a key 22 corresponding to the lowest non-zero illumination level of light controller 20 or similar key of dimming controller 40. Alternatively, lamps 13 and 14 may be at the lowest non-zero level through the sensed absence of an occupant within room 10 sufficient for timer 1 but not timer 2 to have timed out as discussed in greater detail below. Under step 118, the saved level is compared to the lowest non-zero illumination level when the present level of light is already at the lowest nonzero illumination level. When the saved level is the same as the lowest non-zero illumination level, which it is assumed to be when there is no other level being saved, timers 1 and 2 are reset under step 122.

Under step 120, when the saved level is a non-zero illumination level other than the lowest non-zero illumination level, lamps 13 and 14 are set to the saved level. Timers 1 and 2 are reset under step 122 once lamps 13 and 14 are set to their previously saved level under step 120, after a determination that the saved level is the lowest non-zero illumination level under step 118, or when the present level is at a non-zero illumination level other than the lowest non-zero illumination level under step 116.

As previously discussed, once timers 1 and 2 have been reset, controller 20 checks whether any key 22 has been activated under step 102. When no key 22 has been activated, a determination is made under step 104 whether an IR signal is being received. When an IR signal is not being received, timer 2 (e.g. a 90 minute timer) is first checked under step 115. When timer 2 has timed out, control returns to the turn-off sequence, that is, a turn-off signal is sent to ballast 16 under step 111 and timers 1 and 2 are stopped under step 113. When timer 2 has not timed out, timer 1 is checked under step 117 and in the event that timer 1 has not yet timed out, operation of controller 20 returns to step 102. When timer 1 has timed out, the present illumination level is saved under step 119 in a memory of controller 20 and lamps 13 and 14 are set under a step 121 to the lowest non-zero illumination level. Operation of controller 20 now returns to step 102.

Preferably, the time required for timer 1 to time out (e.g. 12 minutes) is set to slightly more than twice the period of time during which the transmission of an occupancy signal by device 30 is inhibited. Consequently, lamps 13 and 14 will not be dimmed to their lowest non-zero illumination level until the period of time required for the generation of at least two occupancy signals from device 30 has elapsed without receipt by controller 20 of at least one such occupancy signal.

As can now be readily appreciated, when an IR signal is received under step 104, the IR signal is first checked under step 106 to determine whether the IR signal includes key control codes for changing the present illumination level. When such key control codes are identified, control returns to a first loop, where the selected key is determined and the level adjusted as discussed above. When the IR signal does not include control key codes, the IR signal is checked under step 108 for the presence of a motion sensor code. When no motion sensor code is present, control returns to step 102 with no change in the illumination level (i.e. the IR signal received by controller 20 must be from a device other than sensor 30 or controller 40 such as from a remote television control device and is disregarded). When a motion sensor code is present and lamps 13 and 14 are at a non-zero illumination level (i.e. room 10 is already illuminated) as determined under step 110, a register is checked under step 112 to determine whether this is the first motion sensor code received by controller 20 since controller 20 was connected to the power line or lamps 13 and 14 were otherwise turned off. When step 112 is determined to be affirmative, controller 20 is switched from the manual mode to the occupancy mode of operation by starting timers 1 and 2 under step 114. When, however, the motion sensor code is sensed under step 108 but lamps 13 and 14 are not lit under step 110, operation of controller 20 returns to step 102. This condition exists when timer 2 has timed out under step 115 or when turn-off key 22a (or a corresponding turn off key of controller 40) under step 103 has been switched on.

When the motion sensor code has been sensed for at least a second time while lamps 13 and 14 are at a non-zero illumination level, operation of controller 20 proceeds from step 112 to step 116. In other words, once timers 1 and 2 have already been started, a determination is made under step 116 as to whether the present illumination level is at the lowest non-zero level of illumination. The present level of illumination can be the lowest non-zero level of illumination when either (i) key 22 of controller 20 corresponding to the lowest non-zero illumination level has been turned on, (ii) an IR signal has been transmitted by remote controller 40 corresponding to the lowest non-zero illumination level or (iii) when timer 1 but not timer 2 times out, that is, under step 121.

The test to determine whether the present level of illumination is at the lowest non-zero level of illumination is determined under step 116 once timers 1 and 2 have been just started under step 114. Alternatively, the present level of illumination is tested under step 116 when the motion sensor code received by controller 20 has been previously received without an intervening period during which lamps 13 and 14 have been turned off. When the present level of illumination is at the lowest non-zero level of illumination, the saved level is tested to determine if it is the same as the lowest non-zero level of illumination under step 118. When the saved level is not the same as the lowest non-zero level of illumination, lamps 13 and 14 are set to the saved level of illumination of step 119 under step 120.

During step 122, timers 1 and 2 will be reset after lamps 13 and 14 have been set to the saved level of illumination under step 120, the present level of illumination is other than the lowest non-zero level of illumination under step 116 or the saved level is the same as the lowest non-zero level of illumination under step 118. In other words, each time the motion sensor code is received by controller 20 and lamps 13 and 14 are at a non-zero level of illumination, timers 1 and 2 will be reset. Preferably, operation of controller 20 is implemented in software within a microcontroller or microcomputer of a type well known to those of ordinary skill in the art such as, but not limited to, part no. Z86E0408PSC made by Zilog Inc. of Campbell, Calif.

Figure 4:
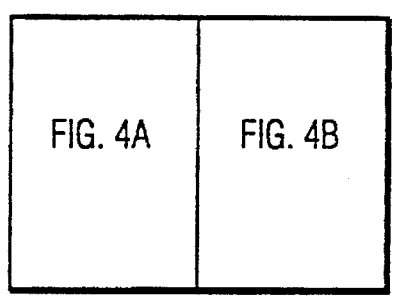
FIG. 4 illustrates the placement of FIGS. 4A and 4B relative to each other.
Figure 4A:
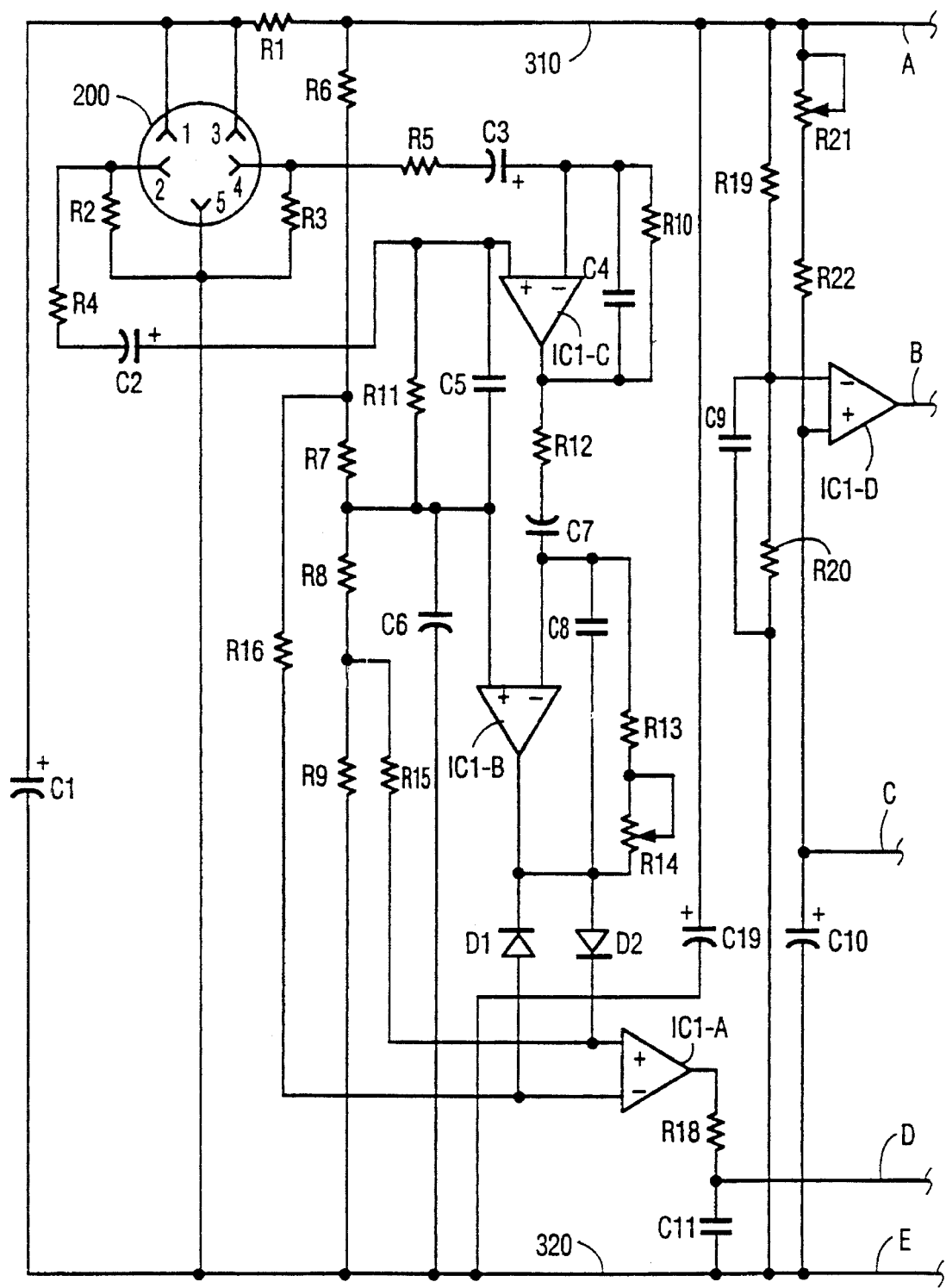
FIGS. 4A and 4B schematically illustrate the occupancy sensing device of FIG. 2.
Figure 4B:
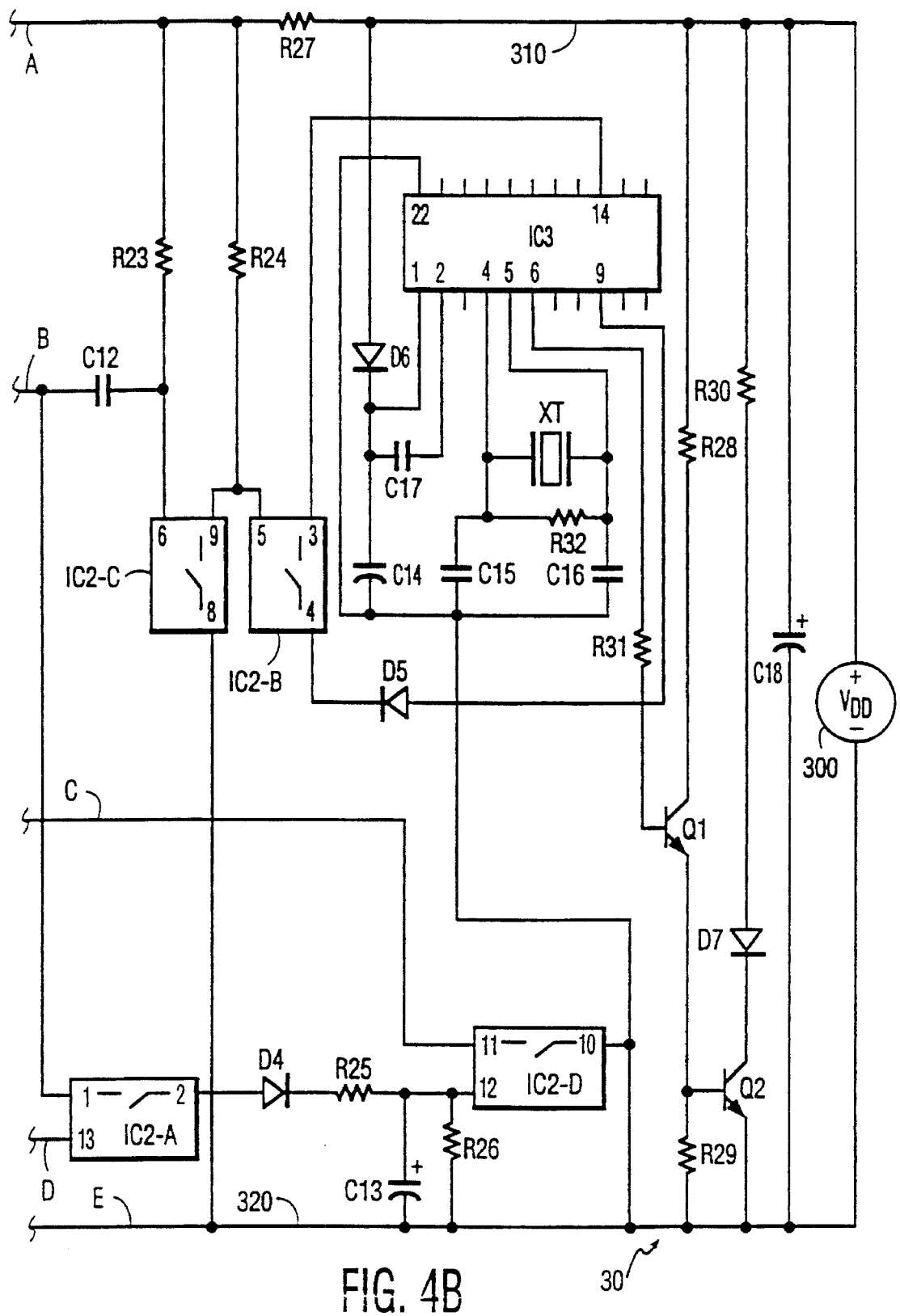

An exemplary implementation of device 30 is shown in FIGS. 4A and 4B which are to be placed together as shown in FIG. 4. The circuitry shown in FIGS. 4A and 4B include integrated circuits, diodes, resistors and capacitors which are identified by prefix reference letters IC, D, R and C, respectively. Typical nominal values for the components of FIGS. 4A and 4B are identified within parenthesis following the respective component.

As shown in FIGS. 4A and 4B, device 30 includes a motion detector 200 (i.e. detector 32 of FIG. 1, detector 50 of FIG. 2) which produces a differential output signal at a pair of pins 2 and 4. The voltage signal produced between pins 2 and 4 increases or decreases the nearer or further away the occupant is to detector 200 and/or the faster or slower the occupant moves past detector 200. Detector 200 is of the passive, infrared type well known in the art and is available, for example, from AMP Inc. of Valley Forge, Pa. as part no. PiRL 180-100.

The signal produced across pins 2 and 4 is supplied to a non-inverting input and an inverting input of a differential amplifier IC1-C (i.e. differential amplifier 56 of FIG. 2) through a pair of first and second high pass filters. The first and second high pass filters are formed from the serial connection of a resistor R4 (32K ohms) to a capacitor C2 (22 µf) and of a resistor R5 (33K ohms) to a capacitor C3 (22 µf), respectively.

Differential amplifier IC1-C includes an associated feedback network of a capacitor C4 (0.01 µf) and a resistor R10 (2M ohms) connected in parallel between the output and inverting input of amplifier IC1-C. Detector 200 also provides through the high pass filter formed by resistor R4 and capacitor C2 and serially connected to the parallel combination of a capacitor C5 (0.01 µf) and a resistor R11 (2M ohms), a signal to the non-inverting input of an operational amplifier IC1-B (i.e. amplifier 58 of FIG. 2).

The output of operational amplifier IC1-C is connected through a coupling circuit to the inverting input of operational amplifier IC1-B. The coupling circuit is formed from a resistor R12 (10K ohms) serially connected to a capacitor C7 (22 µf). A serial connection of a resistor R13 (750K ohms) to a variable resistor R14 (2M ohms) which together are in parallel with a capacitor C8 (0.01 µf), forms a feedback loop between an output and the inverting input of operational amplifier IC1-B. Variable resistor R14 provides for increased or decreased sensitivity of an occupant's motion within room 10. A capacitor C6 (100 µf) connected between the non-inverting input of operational amplifier IC1-B and bus 320 provides a constant reference voltage to the non-inverting input of operational amplifier IC1-B. Preferably, differential amplifier IC1-C and operational amplifier IC1-B together form a band-pass amplifier between about 0.7 Hz and 10 Hz having a total gain of about 75 dB. The output of amplifier IC1-B is shown in FIG. 5A.

A power source 300 having a voltage $V_{DD}$ (e.g. a 3 volt battery) is connected to and between a power supply bus 310 and a reference bus 320. Power source 300, if desired, can be of the solar battery type whereby, during time periods that lamps 13 and 14 are lit, the solar battery is recharged. A steady state D.C. voltage is provided by the combination of a resistor R1 (1K ohms) and a capacitor C1 (220 µf electrolytic) having a relatively long RC time constant for substantially filtering out any noise from power supply 300. Pins 1 and 3 of detector 200 are connected to the junction between resistor R1 and capacitor C1.

A voltage divider connected between bus 310 and bus 320 includes a plurality of resistors R6 (200K ohms), R7 (10K ohms), R8 (10K ohms) and R9 (200K ohms). The voltage divider sets upper and lower levels V+ and V− relative to a reference level (e.g. $V_{DD}/2$) which are applied to the inverting and non-inverting inputs of a voltage comparator IC1-A (i.e. window level detector 62 of FIG. 2). More particularly, voltage $V_{DD}/2$ is provided at the junction between resistors R7 and R8. Voltage V+ relative to voltage $V_{DD}/2$ is provided at the junction between resistors R6 and R7 and is applied through a resistor R16 (1M ohms) to the inverting input of comparator IC1-A. Voltage V− relative to voltage $V_{DD}/2$ is provided at the junction between resistors R8 and R9 and is applied through resistor R15 (1M ohms) to the non-inverting input of comparator IC1-A.

A pair of resistors R2 (100K ohms) and R3 (100K ohms) connected between pin 2 of detector 200 and bus 320 and between pin 4 of detector 200 and bus 320 provide proper biasing of pins 2 and 4, respectively. Voltage comparator IC1-A, operational amplifier IC1-B, differential amplifier IC1-C and voltage comparator IC1-D (discussed in greater detail below) are part of a 14-pin IC package well known in the art and available from Maxim Integrated Product, Inc. of Sunnyvale, Calif. as part no. ICL7642.

Detector 200 includes two sides, one of which is powered by the connection of pin 1 to the junction between capacitor C1 and resistor R1. The other side of sensor 200 is powered by the connection of pin 3 to the junction between capacitor C1 and resistor R1. Depending, in part, on the direction of travel by the occupant within room 10 relative to detector 200, the voltage produced across pins 2 and 4 will increase or decrease resulting in the output of amplifier IC1-B being above V+ or below V− as shown in FIG. 5A. In particular, as shown in FIG. 5A, the time intervals between t1–t2, t3–t4, t5–t6, t7–t8, t9–t10 and t11–t12 are above V+ or below V− and represent the sensed presence by detector 200 of an occupant within room 10.

Referring once again to FIG. 4A, when the output of operational amplifier IC1-B drops below V−, diode D1 conducts resulting in the voltage applied to the inverting input of voltage comparator IC1-A being set to approximately the output of operational amplifier IC1-B. Consequently and for as long as operational amplifier IC1-B is below V−, voltage comparator IC1-A is at a high logic level, that is, between time intervals, t1–t2, t7–t8 and t11–t12 as shown in FIG. 5B. When operational amplifier IC1-B rises above V+, diode D2 conducts resulting in the output voltage of operational amplifier IC1-B being applied to the non-inverting input of voltage comparator IC1-A. In other words, during the time that operational amplifier IC1-B is greater than V+, voltage comparator IC1-A will be at a high logic level (i.e. during time intervals t3–t4, t5–t6 and t9–t10).

Voltage comparator IC1-A therefore serves as a window level detector determining when the output of operational amplifier IC1-B is above V+ or drops below V− relative to $V_{DD}/2$. Each of the time intervals during which voltage comparator IC1-A is at a high logic level represents a period of time during which the presence of an occupant within room 10 is sensed by detector 200. Any noise associated with the high logic level produced by IC1-A is filtered out by the RC combination of a resistor R18 (100K ohms) and a capacitor C11 (0.01 µf) which are serially connected between the output of IC1-A and bus 320. The output of voltage comparator IC1-A is shown in FIG. 5B.

A voltage divider including a resistor R19 (300K ohms) serially connected to the parallel combination of a capacitor C9 (220 µf) and a resistor R20 (750K ohms) is connected between bus 310 and bus 320. The junction between resistor R19 and the parallel combination of capacitor C9 and resistor R20 is relatively constant and is supplied to the inverting input of a voltage comparator IC1-D. Another voltage divider connected between bus 310 and bus 320 includes the serial combination of a variable resistor R21 (2M ohms), a resistor R22 (22K ohms) and a capacitor C10 (220 µf electrolytic). The voltage at the junction between resistor R22 and capacitor C10 is applied to the non-inverting input of IC1-D. Voltage comparator IC1-D and its associated resistors and capacitors serve as the timing circuit (i.e. timer 80 of FIG. 2) for device 30. The RC time constant formed by resistors R21 and R22 and capacitor C10 can be varied based on the resistance of variable resistor R21 between approximately 15 seconds (normally reserved for testing of this timing circuit) and 10 minutes. For exemplary purposes only, the RC time constant chosen has been set for approximately 5 minutes. The voltage across capacitor C10 is shown in FIG. 5C. Voltage comparator IC1-D, with resistor R21 adjusted to about a 5 minute RC time constant, will produce a timing signal which is at a low logic level for about five minutes and then remains at a high logic level until the presence of an occupant within room 10 is detected by detector 200 as shown in FIG. 5E and further discussed below. The output of voltage comparator IC1-D corresponds to the enabling signal produced at output 82 of timer 80 of FIG. 2.

The voltage across capacitor C11 is applied as a control signal to a pin 13 of an analog switch IC2-A as shown in FIGS. 4A, 4B. In other words, whenever the sensed presence of an occupant is detected by detector 200, a control signal supplied to pin 13 of analog switch IC2-A will result in the closing of analog switch IC2-A between a pair of pins 1 and 2 of the latter. Connected to pin 2 of analog switch IC2-A is the serial combination of a diode D4, a resistor R25 (22K ohms) and the parallel combination of a capacitor C13 (4.7 µf electrolytic) and a resistor R26 (4.7M ohms). When switch IC2-A is closed based on the detected presence of an occupant within room 10 and when the output of voltage comparator IC1-D is at a high logic level, the high logic level is stored across capacitor C13 for approximately 10 seconds.

The voltage across capacitor C13 is applied to a pin 12 of an analog switch IC2-D as shown in FIG. 5D. Pin 12 serves as a control input for switch IC2-D, that is, when the voltage at the output of voltage comparator IC1-D is at a high logic level and detector 200 senses the presence of an occupant within room 10, the voltage applied to pin 12 of analog switch IC2-D results in closing of switch IC2-D between a pair of pins 11 and 10 of the latter. When analog switch IC2-D is closed, capacitor C10 of the timing circuit is shunted resulting in discharge of the latter. The discharge of capacitor C10 effectively serves to reset the timing circuit, that is, to begin once again the approximate 5 minute period during which the output of voltage comparator IC1-D is at a low logic level. The voltage pulses applied to pin 12 of analog switch IC2-D correspond to the signal produced at output 76 of pulse generator 68. The RC time constant of capacitor C13 and resistor R26 is chosen so that the duration of time that switch IC2-D is closed is sufficient for fully discharging capacitor C10.

With capacitor C10 discharged, the output of voltage comparator IC1-D (i.e. enabling signal) temporarily changes from a high to low logic level as shown in FIG. 5E (e.g. just after time t1 and time t5 and just before time t8). Once capacitor C10 charges to a level such that the output of voltage comparator IC1-D assumes a high logic level, the output of voltage comparator IC1-D remains at a high logic level until the presence of an occupant within room 10 is once again sensed by detector 200 (i.e. until capacitor C10 discharges).

A series RC circuit connected between bus 310 and the output of voltage comparator IC1-D includes a resistor R23 (4.7M ohms) and a capacitor C12 (0.1 µf). Connected between the junction of resistor R23 and capacitor C12 is a pin 6 of an analog switch IC2-C which serves as a control input for the latter. Voltage $V_{DD}$ is applied to pin 6 of analog switch IC2-C whenever the output of voltage comparator IC1-D is at a high logic level. When pin 6 is at voltage $V_{DD}$ switch IC2-C will close (i.e. be in a conductive state between pins 8 and 9). When switch IC2-C is closed, pin 5, which serves as the control input for an analog switch IC2-B, is electrically connected to reference bus 320. Accordingly, switch IC2-B remains open. When, however, the presence of an occupant within room 10 is sensed by detector 200, the voltage at voltage comparator IC1-D assumes a low logic level due to the discharge of capacitor C10. The voltage applied to pin 6 of analog switch IC2-C is now temporarily lowered to a low logic level before building up once again based on the RC time constant of resistor R23 and capacitor C12 as shown in FIG. 5F.

During the period of time that pin 6 is not at a high logic level (e.g. 60 milliseconds) pin 5 of analog switch IC2-B is at a high logic level, that is, approximately voltage $V_{DD}$ as shown in FIG. 5G. The pulses of voltage at pin 5 correspond to the signal provided at output 70 of pulse generator 68 of FIG. 2. When pin 5 of switch IC2-B is at a high logic level, switch IC2-B closes (i.e. changes to a conductive state between pins 3 and 4). With analog switch IC2-B closed, a conductive path exists between pins 9 and 14 of a remote encoder IC3. More particularly, a conductive path now exists between pins 9 and 14 through a diode D5 and analog switch IC2-B. Encoder IC3 is a 22 pin IC package well known in the art and available, for example, from Panasonic Industry Corp. of Cypress, Calif. as part no. MN6011A. Encoder IC3 receives power into pin 1 from power source 300 through a diode D6. A crystal oscillator XT, nominally at 480 KHz, is connected between pins 4 and 5 of encoder IC3. A resistor R32 (10M ohms) is connected in parallel with crystal oscillator XT. A capacitor C16 (100 pf), a capacitor C14 (220 µf) and a capacitor C17 (2200 pf) are serially connected between pins 2 and 5 of encoder IC3. Pin 22 of encoder IC3 is connected to the junction joining capacitors C14 and C16, bus 320 and a capacitor C15 (100 pf) the latter of which is also connected pin 4 of encoder IC3. Pin 1 is also connected to a junction joining diode D6, capacitor C17 and capacitor C14.

Encoder IC3 outputs a signal from pin 6 through a resistor R31 (3.3K ohms) to the base of an NPN bipolar transistor Q1. When pin 9 is connected to pin 14 through diode D5 and analog switch IC2-B, that is, when detector 200 senses the presence of an occupant within room 10, encoder IC3 outputs at pin 6 a pulse train nominally of 60 milliseconds in duration. The pulse train repeatedly turns on and off transistor Q1. Connected between bus 310 and the collector of transistor Q1 is a resistor R28 (47 ohms). Connected between the emitter of transistor Q1 and bus 320 is a resistor R29 (22K ohms). The base of an NPN bipolar transistor Q2 is connected to the junction joining the emitter of transistor Q1 to resistor R29. Whenever transistor Q1 is turned on based on the pulse train generated at pin 6 of encoder IC3, a voltage is developed across resistor R29 resulting in transistor Q2 being turned on. In other words, transistor Q2 is repeatedly turned on and off for the duration of the pulse train produced at pin 6 of encoder IC3.

Connected between bus 310 and an emitter of transistor Q2 is the serial combination of a resistor R30 (1 ohm) and an infrared light-emitting diode D7. The emitter of transistor Q2 is connected to bus 320. Whenever transistor Q2 is turned on, light emitting diode D7 transmits an infrared signal which is received by controller 20 and/or another occupancy sensing device. The transmitted IR signal is shown in FIG. 5H. The approximately 60 millisecond pulse train generated at pin 6 of IC3 results in repeatedly turning on and off transistor Q1 which provides the base drive for repeatedly turning on and off transistor Q2. A resulting pulse train of IR signals for an approximate 60 millisecond duration are transmitted by light emitting diode D7 to controller 20.

A capacitor C18 (220 µf electrolytic) connected across power source 300 and a resistor R27 (1K ohms) provide an RC time constant to further aid in the maintenance of a relatively constant DC voltage on bus 310. Analog switches IC2-A, IC2-B, IC2-C and IC2-D are part of a 14 pin IC package, commonly available, for example, from National Semiconductor Corporation of Santa Clara, Calif. as part no. 74HCT4066. Transistors Q1 and Q2 are NPN-type bipolars well known in the art and available, for example, from the ROHM Group of San Jose, Calif. as part nos. 2SC4038 and 2SD1920, respectively. Diodes D1, D2, D4, D5 and D6 are also commonly available from, for example, Panasonic Industry Corp. of Cypress, Calif. as part no. IN4148.

As now can now be readily appreciated, detector 200 detects the presence of an occupant within room 10. The sensitivity of detector 200 to the presence of an occupant in room 10 can be adjusted by varying the resistance of variable resistor R14 which controls the amount of feedback with respect to operational amplifier IC1-B. Following each initial transmission of approximately 60 milliseconds by diode D7 of an IR signal representing the detected presence of an occupant within room 10, a timer initiated in response to the sensed presence by detector 200 of an occupant and based on the RC time constant of resistors R21 and R22 and capacitor C10 results in delaying (inhibiting) subsequent transmission of the IR signal.

More particularly, following each initial transmission by diode D7 representing the detected presence of an occupant within room 10 by detector 200, any further detected presence of an occupant within room 10 by detector 200 does not result in the transmission of an IR signal by diode D7 until voltage comparator IC1-D returns to (i.e. assumes) a high logic level. Voltage comparator IC1-D changes from a high logic level to a low logic level and maintains the low logic level for a period of time of about one RC time constant (i.e. resistors R21, R22 and capacitor C10). There are no subsequent transmissions of an IR signal from diode D7 until the output of IC1-D returns to a high logic level, that is, until the about one RC time constant has elapsed. Consequently, a minimal amount of power is consumed from power source 300 so as to conserve power and thereby extend the life of power source 300 for a relatively long period of time.

The scheme of repeatedly inhibiting transmission of an IR signal in accordance with the invention is particularly designed so as to conserve power when using a power source independent of a power line (i.e. utility line). The power source, however, can be powered from a utility line with appropriate transformation to voltage level $V_{DD}$. Device 30 as shown in FIG. 4B includes diode D7 for transmitting a signal to controller 20 in the form of an infrared signal. Other suitable devices for transmitting the detected presence of an occupant within room 10 can be used in lieu of diode D7 such as, but not limited to, ultrasonic or radio frequency communication between device 30 and controller 20.

Detector 200, as disclosed above, detects the presence of an occupant within room 10. Any number of different types of detectors for sensing the presence of an occupant within a room can be used including, but not limited to, an infrared motion type detecting device. By using a detector and a transmitter which detect and transmit the same type of energy (e.g. infrared) a plurality of devices 30 can be used within room 10 for sensing the presence of an occupant therein.

The invention provides an improved remote occupancy sensing device, that is, a sensing device which is both separate from the light controller and independent of a utility power line. The remote occupancy sensing device has very low power consumption requirements by inhibiting transmission of an occupancy signal to the light controller for a predetermined period of time subsequent to the initial period of transmission. Such low power consumption requirements are ideal for operation of device 30 by battery power for extended periods of time.

The remote occupancy sensing device operates in combination with a light controller to minimize the level of illumination when the area to be illuminated is not occupied. The period of time during which transmission from the sensing device is inhibited is preferably for less than one-half the period of time required to time out timer 1. For example, the transmitter of device 30 can be inhibited for approximately five minutes whereas timer 1 requires approximately 12 minutes to time out. Consequently, lamps 13 and 14 will not be dimmed by controller 20 to the lowest non-zero illumination level unless controller 20 (once in the occupancy mode) fails to receive a signal from transmitter 36 (or transmitter 36a) for a period of time greater than twice the RC time constant of resistors R21, R22 and capacitor C10 of device 30.

Detector 200 is continuously sensing for the presence of at least one occupant within room 10. Nevertheless, by inhibiting the transmission of a signal from diode D7 for a predetermined period of time subsequent to the initial period of transmission (e.g. approximately 60 milliseconds), power consumption requirements of power supply 300 are substantially minimized.

It will thus be seen that the objects set forth above, and those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for signaling the sensed presence of an occupant within an area, comprising:
   detecting means for sensing the presence of the occupant within the area;
   transmitting means for producing more than one occupancy signal transmission, each signal transmission corresponding to the currently sensed presence of the occupant by said detecting means; and
   means for inhibiting for a first predetermined period of time production of at least one signal transmission following each produced signal transmission.

2. The device of claim 1, in which the device is operable independent of connection to a utility power line.

3. The device of claim 2, in which includes a battery for powering of the device.

4. The device of claim 3, in which the detecting means includes an infrared motion detector.

5. The device of claim 4, in which the detecting means includes means for continuously sensing for the presence of at least one occupant within the area.

6. The device of claim 1, in which the detecting means includes means for continuously sensing for the presence of at least one occupant within the area.

7. The device of claim 1, in which the detecting means is a motion detector and the transmitting means transmits a wireless occupancy signal to a light controller including control means for changing the level of illumination of a lamp.

8. The device of claim 1, in combination with a remotely located light controller, said light-controller including control means for changing the level of illumination of a lamp in the absence of a signal transmission received from the transmitting means within a second predetermined period of time, the first predetermined period of time being less than the second predetermined period of time.

9. The device of claim 8, in which the first predetermined period of time is not greater than one-half of the second predetermined period of time.

10. The device of claim 6, in combination with a light controller, said light controller including control means for changing the level of illumination of a lamp in the absence of a signal transmission received from the transmitting means within a second predetermined period of time, the first predetermined period of time being less than the second predetermined period of time.

11. The device of claim 10, in which the first predetermined period of time is not greater than one-half of the second predetermined period of time.

12. The device of claim 1 in combination with an additional device, said additional device having detecting means, transmitting means and inhibiting means the same as the detecting means, transmitting means and inhibiting means of said device, respectively, wherein the detecting means of said device is further responsive to signal transmissions from the transmitting means of said additional device such that the transmitting means of said device produces a signal transmission representing the presence of the occupant sensed by said additional device.

13. The device of claim 1, wherein said inhibiting means includes timing means for producing an enabling signal after each first predetermined period of time has elapsed, said timing means having comparator means for comparing a substantially constant reference level to a time dependent, variable level.

14. The device of claim 13, wherein said timing means further includes a resistive-capacitor circuit for producing said time dependent, variable level.

15. The device of claim 13, wherein said inhibiting means further includes reset means for resetting the time dependent variable level based on the currently sensed presence of an occupant by the detecting means whereby said timing means is reset.

16. The device of claim 15, wherein said timing means further includes a resistive-capacitive circuit for producing said time dependent, variable level.

17. The device of claim 16, wherein said inhibiting means further includes generating means responsive to said enabling signal for producing a control signal, said transmitting means being responsive to said control signal in producing a signal transmission.

18. The device of claim 15, wherein said inhibiting means further includes generating means responsive to said enabling signal for producing a control signal, said transmitting means being responsive to said control signal in producing a signal transmission.

19. A system for controlling a lamp, comprising:
   light control means for adjusting the level of illumination provided by the lamp based on an occupancy signal; and
   a battery powered remote controller, including:
      detecting means for sensing the presence of an occupant within an area illuminated by the lamp;
      transmitting means for producing more than one occupancy signal transmission, each signal transmission corresponding to the currently sensed presence of the occupant by said detecting means; and
      means for inhibiting for a first predetermined period of time production of at least one signal transmission following each produced signal transmission.

20. The system of claim 19, in which the detecting means includes an infrared motion detector.

21. The system of claim 20, in which the detecting means includes means for continuously sensing for the presence of at least one occupant within the area.

22. The system of claim 19, wherein the detecting means includes a motion detector, the remote controller and the light control means are spaced apart, and the occupancy signal is transmitted from the remote controller to the light control means via wireless electromagnetic radiation.

23. The system of claim 19, in which the light control means includes means for controlling a change in the level of illumination of the lamp in the absence of a signal transmission received from the transmitting means within a second predetermined period of time, the first predetermined period of time being less than the second predetermined period of time.

24. The system of claim 23, wherein said means for controlling the change in the level of illumination of the lamp includes means for dimming the level of illumination of the lamp.

25. The system of claim 23, wherein said means for controlling the change in the level of lamp illumination is operable, in the absence of a signal transmission received from the transmitting means for a third predetermined period of time, for turning off the lamp, said third predetermined period of time being greater than said second predetermined period of time.

26. The system of claim 19, in which the detecting means includes means for continuously sensing for the presence of at least one occupant within the area.

27. The system of claim 19, wherein said inhibiting means includes timing means for producing an enabling signal after each first predetermined period of time, reset means for resetting said timing means based on the currently sensed presence of the occupant by said detecting means and generating means responsive to said enabling signal for producing a control signal, said transmitting means being responsive to said control signal in producing a signal transmission.

28. The system of claim 27, wherein said timing means includes comparator means for comparing a substantially constant voltage to a time dependent, variable voltage.

29. A method for signalling to a light controller the sensed presence of an occupant within an area, comprising the steps of:

sensing for the presence of the occupant within the area;

producing more than one occupancy signal transmission, each signal transmission corresponding to the currently sensed presence of the occupant; and inhibiting for a first predetermined period of time production of at least one transmission following each produced transmission.

30. The method of claim 29, further including changing the level of lamp illumination controlled by the light controller in the absence of a signal transmission within a second predetermined period of time, the first predetermined period of time being less than the second predetermined period of time.

31. The method of claim 30, wherein the step of sensing is carried out continuously.

32. The method of claim 30, wherein the first predetermined period of time is not greater than one-half of the second predetermined period of time.

33. The method of claim 31, wherein the first predetermined period of time is not greater than one-half of the second predetermined period of time.

34. The method of claim 30, wherein the step of changing the level of lamp illumination includes dimming the level of lamp illumination.

35. The method of claim 30, further including turning off a lamp in the absence of a signal transmission within a third predetermined period of time, the second predetermined period of time being less than the third predetermined period of time.

36. The device as claimed in claim 1 wherein said inhibiting means comprises:

timing means for producing an enabling signal after said first predetermined period of time has elapsed, and pulse generating means controlled by said enabling signal and by a further signal supplied by the detecting means and indicative of a sensed presence of an occupant within said area for deriving a first trigger signal to reset the timing means and a second trigger signal to operate the transmitting means.

37. The device of claim 1 wherein said transmitting means periodically transmits signal transmissions corresponding to currently sensed presences of the occupant by the detecting means, and the inhibiting means inhibits any further signal transmissions by the transmitting means subsequent to a periodically transmitted signal transmission and during said first predetermined time period.

38. The device of claim 8 wherein the second predetermined time period immediately follows the first predetermined time period.

* * * * *